(No Model.)
G. P. KATO, Jr.
SAFETY FENDER FOR CARS.
No. 559,979. Patented May 12, 1896.
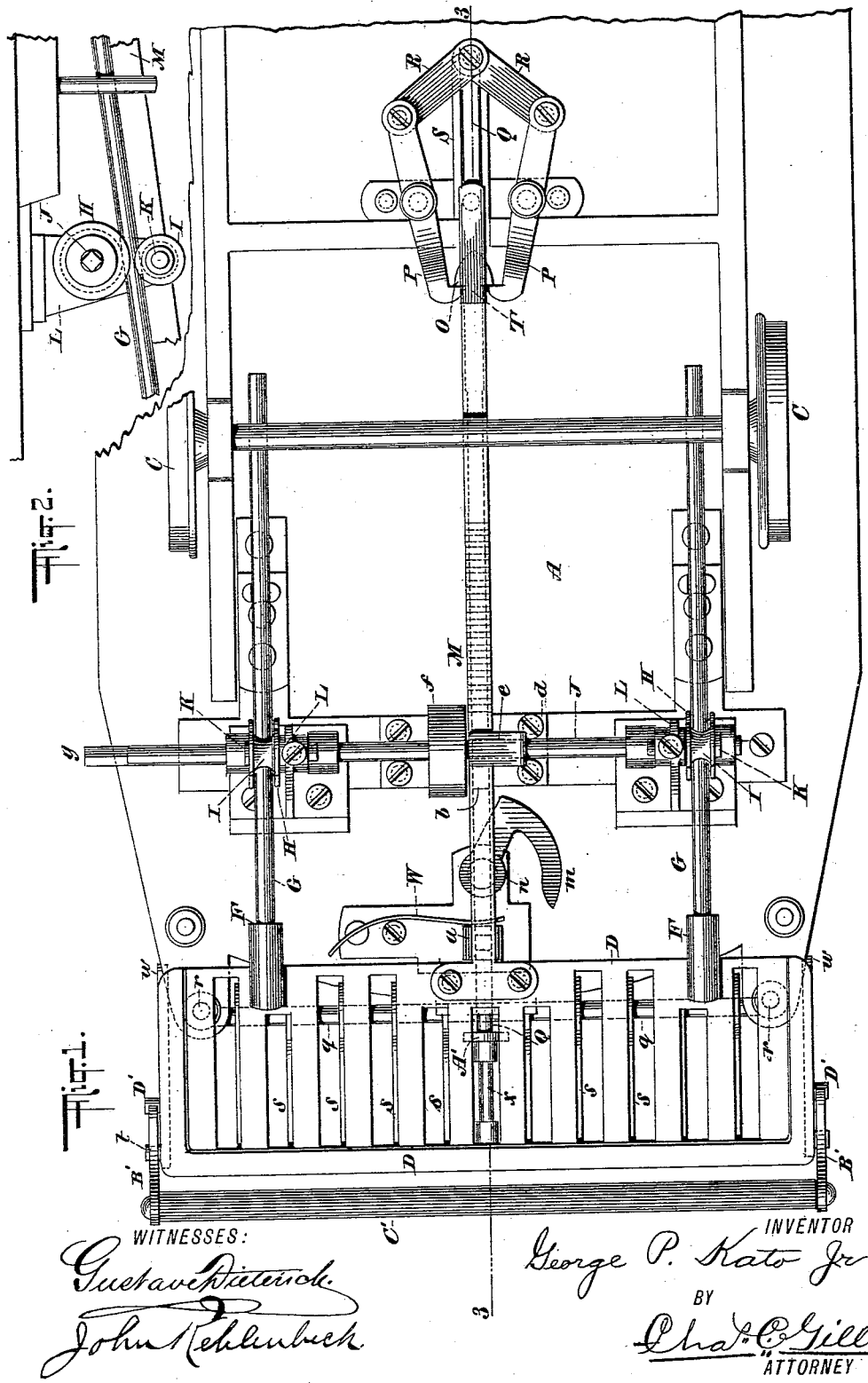
WITNESSES:
Gustave Dieterich
John Kehlenbeck
INVENTOR
George P. Kato Jr.
BY
Chas. C. Gill
ATTORNEY

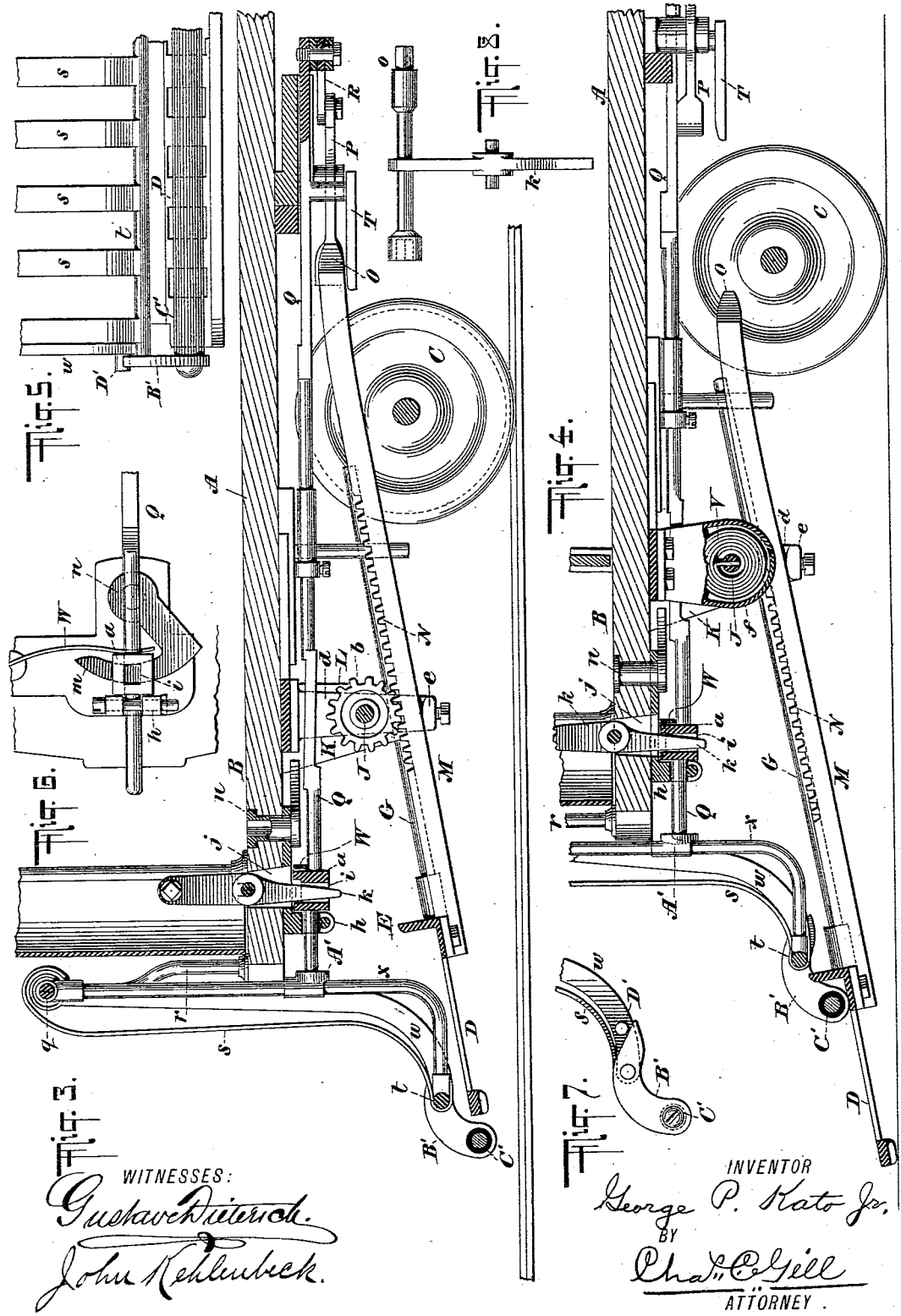

UNITED STATES PATENT OFFICE.

GEORGE P. KATO, JR., OF JERSEY CITY, NEW JERSEY.

SAFETY-FENDER FOR CARS.

SPECIFICATION forming part of Letters Patent No. 559,979, dated May 12, 1896.

Application filed August 10, 1895. Serial No. 558,814. (No model.)

*To all whom it may concern:*

Be it known that I, GEORGE P. KATO, Jr., a citizen of the United States, and a resident of Jersey City, in the county of Hudson and State of New Jersey, have invented certain new and useful Improvements in Safety-Fenders for Cars, of which the following is a specification.

The invention relates to improvements in safety-fenders for cars; and it consists in the novel features of construction and combinations of parts hereinafter described, and particularly pointed out in the claims.

Referring to the accompanying drawings, Figure 1 is a bottom view, partly broken away, of a portion of a street-car employing the fender and operative devices constructed in accordance with and embodying the invention. Fig. 2 is a detached side elevation of a portion of same. Fig. 3 is a vertical section of same on the dotted line 3 3 of Fig. 1 and illustrating the fender in its elevated or running position. Fig. 4 is a like section of same, but partly broken away to disclose the coiled spring by which the fender may be shot forward, the fender in this figure being illustrated in its lower position, which is the position it will instantly assume upon an object on the track being struck by that portion of the mechanism which will actuate the fender to descend to its lower position. Fig. 5 is a detached front elevation of a portion of the fender and coöperating devices. Fig. 6 is a detached bottom view of a portion of the car and illustrating the means for locking the fender in its inward position. Fig. 7 is a detached side elevation of the lower portion of the guard hinged to the front of the car and hereinafter particularly referred to; and Fig. 8 is a detached side elevation of a combined key and lever which may be utilized to free the fender from the devices which lock it at its inward position, to return the fender to its inward position, and as a means whereby the motorman may, upon observing an object upon the track, cause the fender to shoot forward to its lower position.

In the drawings, A designates the usual car, B the platform thereof, and C the usual wheels. Below the car is suspended the fender D, which, as illustrated more clearly in Fig. 1, is formed of a slotted metal plate and extends transversely across the car-track. The inner edge of the fender D is provided with the substantially vertical flange E and also with the hubs F F, which receive the outer ends of the rods G G, which serve as supports for the outer ends of the fender D. The rods G G are preferably round in cross-section and pass inward between the grooved rollers H I, which operate by their form to guide the said rods and to insure the proper direction of movement in the fender D. The grooved rollers H I also serve as supports or bearings for the rods G G. The rollers H are mounted upon the outer portions of the shaft J, and the rollers I are mounted upon the short shafts K, extending outward from the hangers L. At the center of the rear edge of the fender D is firmly secured the outer end of the rod M, which is provided upon its upper surface with the teeth N and at its inner end with the head O, the opposite sides of the latter forming shoulders or projections adapted to be engaged by the front ends of the levers P P, as illustrated more clearly in Fig. 1.

The levers P P are pivotally secured and are connected to each other and to a longitudinal rod Q by means of the links R R. The inner end of the rod Q is adapted to move in the guides S, as illustrated in Fig. 1, and is provided on its lower side with the plate T, which aids in preventing the inner end of the rod M from losing its position between the outer or engaging ends of the levers P P. The rod Q is adapted to have a reciprocating motion, and its purpose is, when pressed inward, to draw the inner ends of the levers P P toward each other, thereby moving the outer ends of said levers from contact with the head O and permitting the rod M and fender D to be shot forward by the spring V, as hereinafter more clearly explained. The rod Q has a normal spring tension outward by means of the spring W, which, as illustrated in Fig. 1, is flexed against the head *a*, formed on said rod, and hence the normal tension of the rod Q is outward, as shown in Fig. 1, this tension insuring an outward pressure being exerted against the inner ends of the levers P P, and consequently an inward pressure against the outer ends of said levers toward the opposite sides of the inner end of the rod M, whereby the said levers are enabled to operate as spring-latches to engage the head O with every inward movement of the rod M and fender D. The levers P P only release the head O when the rod Q is forced inward sufficiently to move the outer ends of the said levers from contact with the rod M.

The rod M constitutes along its middle portion a rack, as illustrated in Fig. 3, and this rack is in engagement with the gear-wheel $b$, which is mounted upon the shaft J above referred to and which shaft extends transversely across the car and is held in suitable bearings formed in the hangers K, also referred to above. The central portion of the shaft J has a bearing in the hanger $d$, which carries at its lower end the horizontal plate $e$, having a rounded upper surface and adapted, as indicated in Fig. 1, to retain the rod M in proper relation to the gear-wheel $b$. Upon the shaft J is secured one end of the coiled spring V, which is inclosed within the casing $f$ and utilized to cause the outward movement of the fender D and its connected parts. When the levers P P release the head O of the rod M, the spring V, acting through the shaft J and gear-wheel $b$, will cause the rod M, fender D, and rods G to move outward from the position illustrated in Fig. 3 to that illustrated in Fig. 4, and when it is desired to return the fender D, rods G, and rod M to their inward position (illustrated in Fig. 3) the shaft J will, by means of a key fitted to its outer squared end $g$, be rotated in a reversed direction, thereby, through the gear-wheel $b$ and teeth N, returning the rod M, fender D, and rods G to their inward position, while at the same time this reverse rotation of the shaft J will wind the spring V in order that the said fender when at its inward position will be under the full pressure of the said spring. The key applied to the outer squared end $g$ of the shaft J will be caused to rotate the said shaft until the head O of the rod M passes between and is firmly held by the levers P P.

The head $a$ on the rod Q is adjacent to the outer end of said rod and at the inner side of the stop $h$, which serves to prevent the rod Q from having an undue movement outward and also as a guide for the outer end of said rod. The stop $h$ is open at its center to receive and permit the proper reciprocating motion of the outer end of the rod Q, as illustrated more clearly in Figs. 3 and 4. The head $a$ is provided with the vertical opening $i$ in line with the opening $j$ in the car-platform, and the object of said opening $i$ is to receive the lower end of the pivotally-mounted lever $k$, the latter being detachably mounted in suitable ears upon the platform of the car, and having its upper end extending upward sufficiently to render it convenient for the motorman by pressing outward thereupon to cause the lower end of said lever $k$ to drive the rod Q inward for the purpose of freeing the levers P P from the head O, and permitting the spring V to drive the fender D outward to the position illustrated in Fig. 4. The lever $k$ will be used for the purpose of causing the fender D to shoot outward when the motorman sees an object upon the track, and is of well-known form, having been illustrated in the patent granted to me June 18, 1895, No. 541,282. The upper end of the head $a$ on the rod Q is grooved transversely to receive the hook $m$ when it is desired to lock the fender D at its inward position. The hook $m$ is secured to a hub $n$, which extends upward through the car-platform, as illustrated in Fig. 3, and contains a central aperture adapted to receive the key $o$, connected with the lever $k$. When the lever $k$ is lifted from its bearings, the key $o$ may be utilized to rotate the hub $n$ and thereby cause the hook $m$ to engage the head $a$ or to pass from engagement therewith as desired. When it is desired to lock the fender D at its inward position, the lever $k$ will be withdrawn from its bearings and its key $o$ utilized to cause the locking of the hook $m$ and head $a$ together, and when the said hook $m$ and head $a$ are in this relation, which is that illustrated in Fig. 6, it will be impossible to free the levers P P from the head O and hence the rod M and fender D cannot at such time be moved outward. It will be observed upon reference to Fig. 6 that the hook $m$ when in engagement with the head $a$ closes the vertical opening $i$ in said head, and hence while the hook $m$ is in the position illustrated it will be impossible to introduce the lever $k$ to the position illustrated in Fig. 3, and the purpose of thus closing the opening $i$ by the hook $m$ is to insure the unlocking of the devices holding the fender before the motorman can start off with the car. If the lever $k$ could be inserted downward through the opening $j$ and opening $i$ before the hook $m$ were freed from the rod Q, it is possible that the motorman would forget to unfasten the hook $m$ before starting off with the car; but when the hook $m$ serves to prevent the due insertion of the lever $k$ it is a reminder that the fender is not in condition to operate and the motorman will thus be compelled to release the hook $m$ before starting on his trip with the car.

At the front of the car is provided a transverse bar $q$, which is mounted in bearings at the upper ends of vertical supporting-rods $r$ and forms the upper portion of a guard or frame composed of a series of plate-springs $s$, arranged as illustrated more clearly in Fig. 5, the said springs being separated from one another and held at their upper ends upon the said rod $q$ and at their lower ends upon the corresponding rod $t$. The rod $t$ is supported at its ends by the bars $w$, which extend downward from the outer ends of the rod $q$ to the outer ends of the rod $t$, and the central portion of the rod $t$ is supported by the rod $x$, which extends downward from the central portion of the rod $q$ to the central portion of the rod $t$, but sufficiently in rear of the springs s not to interfere with the latter having a due spring action upon striking or being struck by a person who may be on the track. The springs s are coiled upon the rod q, as illustrated in Fig. 3, and thence extend downward and outward to the rod t, so as to constitute a substantial spring-cushion. The rod x is provided with a contact-plate A', which is in line with the rod Q, and rests against the outer end thereof in order that upon an object striking the springs s the said plate A' will forcibly press the rod Q inward and thereby free the levers P P from the head O, in order that the spring V may drive the fender D outward to the position illustrated in Fig. 4. At the lower ends of the bars w, connecting the rod q with the rod t, are pivoted the curved plates B', carrying at their lower end the roller C', and having their upper ends below the stop-pins D' secured to the said bars w, as illustrated more clearly in Fig. 7. The roller C will preferably be covered with rubber, so as to be soft, and will be prevented from lowering unduly by reason of the stop-pins D', which, however, will not prevent the said roller from elevating when, during any rocking action of the car, the said roller might come into contact with the road-bed between the tracks. Should such rocking action in the car take place, the contact of the roller C' with the road-bed would result in the plates B' turning upward upon their pivots and thus the operative mechanism would not be set in motion to drive the fender D outward, as might result if the plates B' were not provided, and adapted to operate in the manner described.

When the fender D is shot forward, it passes outward beyond the roller C', as illustrated in Fig. 4, and at such time the roller C' lies close against the vertical flange E at the inner edge of the fender D, in which position it would prevent the said flange from injuring any one who might be caught upon the fender.

In the use of the invention should the motorman discover a person upon the track and in a position likely to be struck by the car he would press outward with his foot or otherwise upon the upper end of the lever k, thus causing the lower end of said lever to move the rod Q inward for the purpose of freeing the levers P P from the head O and permitting the spring V to drive the fender D outward from the position illustrated in Fig. 3 to that illustrated in Fig. 4.

Should the motorman not observe the person upon the track or not be able to operate the lever k, the contact of the springs s against the person will cause the plate A' to drive the rod Q inward with the same effect as though the motorman had driven the rod Q inward by means of the lever k. After the fender D has been moved outward for the purpose of preventing an accident it may be restored to its inward position (illustrated in Fig. 3) by means of a key applied to the shaft J, which upon being rotated will wind the spring V and turn the wheel b, the latter cooperating with the teeth N to move the rod M and fender D inward until the levers P P catch upon and retain the head O of said rod M. During the outward and inward movement of the fender D the latter is supported and guided by the rods G G, held between the grooved rollers H I. When the fender is at the rear end of the car, it will be locked at its inward position by means of the hook m in the manner above described, since at such time it will be unnecessary to have the fender in position to be shot outward.

What I claim as my invention, and desire to secure by Letters Patent, is—

1. In combination with a car, the fender, the rods G, G, secured thereto, the rod M having a toothed rack also secured to said fender, the grooved rollers H, I, receiving the said rods G, the transverse shaft J having the gear-wheel b in engagement with the said rack, a spring for imparting an outward tension to the fender, a latch engaging the rod M when the fender is at its inward position, a rod adapted to have a movement to free said fender when it is desired to have the latter move outward under the action of the spring, and a lever within reach of the motorman for actuating said rod; substantially as set forth.

2. The car, and the guard hinged at the end thereof and composed of the rods q, t, the side bars w, series of plate-springs s and rod x, having a contact-plate A', combined with the fender D, rods connected with said fender and extending inward through bearings beneath the car, gearing for moving said fender, a spring exerting an outward tension upon the fender, spring-latch mechanism for retaining the fender at its inward position and the rod for freeing said latch mechanism when pressed upon by the contact-plate A'; substantially as set forth.

3. In combination with the car, the fender D, the rod M secured to said fender and having the rack N and head O, the tranverse shaft carrying the gear-wheel b, in engagement with said rack, the coiled spring V connected with said shaft and exerting a tension on said gear-wheel, latch mechanism for engaging said rod M when the fender is at its inward position, and an actuating-rod Q for freeing said latch mechanism from the rod M when it is desired to have the fender move outward; substantially as set forth.

4. In combination with the car the fender D, the rod M secured to said fender and having the rack N and head O, the transverse shaft carrying the gear-wheel b in engagement with said rack, a spring for imparting an outward tension to the fender, the pivoted levers P adapted to engage said head on the rod M, the links R, R, pivotally connected together and to said levers P, and the rod Q pivotally connected to said links at their meeting ends and extending forward in position to be acted upon by the motorman and having a spring-tension outward; substantially as set forth.

5. In combination with the car, the fender D, rod M secured to said fender and having the rack N, the transverse shaft J carrying the gear-wheel $b$ in engagement with said rack, a spring for imparting an outward tension to said fender, the levers P adapted to engage the rod M when the fender is at its inward position, the links R, R, connecting said levers, the rod Q connected with said links and extending forward in position to be acted upon by the motorman, the plate T connected with said rod Q, and the spring imparting an outward tension to said rod Q; substantially as set forth.

6. In combination with the car, the fender D, the rod M secured to said fender and having the rack N, the transverse shaft J having the gear-wheel $b$ in engagement with said rack, a spring for imparting an outward tension to said fender, latch mechanism for engaging the rod M when the fender is at its inward position, the rod Q connected with said latch mechanism and extending forward to the end of the car, a spring exerting an outward tension upon said rod Q, and the pivoted hook $m$ having an exposed hub and adapted to engage the said rod Q and lock it in position for the purpose of preventing any outward movement of the fender D; substantially as set forth.

7. In combination with the car, the fender D, the rod M secured to said fender and having a rack N and head O, the transverse shaft J carrying the gear-wheel $b$ in engagement with the said rack, a spring for imparting an outward tension to said fender, latch mechanism for engaging said head when the fender is at its inward position, the rod Q connected with said latch mechanism and having a spring-tension outward, the head $a$ on said rod Q and having a vertical opening, the lever $k$ pivotally mounted upon the platform of the car and extending downward through said opening, and the pivoted hook $m$ having an exposed hub and adapted to engage said head when the lever $k$ is not in position and close the opening thereof; substantially as set forth.

8. In combination with the car, the fender D, the rods G, G, secured adjacent to the ends thereof, the pairs of grooved rollers H, I supported from the bottom of the car and receiving said rods, the rod M secured to said fender intermediate the rods G, and having the rack N, transverse shaft J, carrying the gear-wheel $b$ in engagement with said rack, the spring V coiled upon the shaft J and imparting an outward tension to the fender, spring-latch mechanism for engaging the rod M when the fender is at its inward position, and means substantially as described for freeing said latch mechanism when it is desired to have the fender move outward; substantially as set forth.

Signed at New York, in the county of New York and State of New York, this 31st day of July, A. D. 1895.

GEORGE P. KATO, JR.

Witnesses:
CHAS. C. GILL,
E. JOS. BELKNAP.